United States Patent
Yamaguchi et al.

(10) Patent No.: US 7,350,438 B2
(45) Date of Patent: Apr. 1, 2008

(54) CONNECTION ROD FOR INTERNAL COMBUSTION ENGINE

(75) Inventors: Masashi Yamaguchi, Yokohama (JP); Satoru Ookuma, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 549 days.

(21) Appl. No.: 11/125,239

(22) Filed: May 10, 2005

(65) Prior Publication Data

US 2005/0263126 A1 Dec. 1, 2005

(30) Foreign Application Priority Data

May 31, 2004 (JP) .............................. 2004-161158

(51) Int. Cl.
*F16C 9/04* (2006.01)
(52) U.S. Cl. ................. 74/579 E; 29/525.02; 411/411; 411/916
(58) Field of Classification Search ............. 74/579 R, 74/579 E; 123/197.3; 29/413, 525.11, 525.02, 29/525.2, 526.2, 557, 558, 565, 888.08, 888.09, 29/888.092; 411/411, 424, 916
See application file for complete search history.

(56) References Cited

U.S. PATENT DOCUMENTS

| | | | | |
|---|---|---|---|---|
| 2,407,928 A | * | 9/1946 | Herreshoff et al. | ...... 411/366.1 |
| 3,455,587 A | * | 7/1969 | Gallois | ................... 403/408.1 |
| 4,018,132 A | * | 4/1977 | Abe | ........................... 411/413 |
| 4,548,127 A | * | 10/1985 | Dunn et al. | .................. 92/220 |
| 5,485,765 A | * | 1/1996 | Khatiblou | ................ 74/579 E |
| 5,492,019 A | * | 2/1996 | Madden | .................. 73/862.23 |
| 6,125,526 A | * | 10/2000 | Wierzchon | .............. 29/525.02 |
| 6,276,233 B1 | * | 8/2001 | Bolyard, III | ............. 74/579 E |

FOREIGN PATENT DOCUMENTS

| | | |
|---|---|---|
| CN | 2315345 Y | 4/1999 |
| JP | H05-45222 U | 6/1993 |
| JP | H05-202923 A | 8/1993 |
| JP | 07293546 A * | 11/1995 |

* cited by examiner

*Primary Examiner*—Chong H Kim
(74) *Attorney, Agent, or Firm*—Global IP Counselors, LLP

(57) ABSTRACT

An internal combustion engine connecting rod is designed with bolts having a minimum required strength. A strength safety factor Sfa is calculated based on an axial strength limit load $F_X$ of the bolt and the maximum load $F_B$ to be born by the bolt due to a piston inertia force ($Sfa=F_X/F_B$) acting on the connecting rod. A mating surface separation safety factor Sfb is calculated based on the tensile load ($F_B-F_C$) resulting from the piston inertia force and the load $F_E$ carried by the bolts at a mating surface separation limit, i.e., the maximum bolt load $F_E$ at which the connecting rod main body and the cap remain in contact without separating ($Sfb=F_E/(F_B-F_C)$). The mating surface separation safety factor Sfb of the connecting rod is set to be equal to or larger than the strength safety factor Sfa of the bolts ($Sfb \geq Sfa$).

19 Claims, 2 Drawing Sheets

CONNECTION ROD FOR INTERNAL COMBUSTION ENGINE

CROSS-REFERENCE TO RELATED APPLICATIONS

This application claims priority to Japanese Patent Application No. 2004-161158. The entire disclosure of Japanese Patent Application No. 2004-161158 is hereby incorporated herein by reference.

BACKGROUND OF THE INVENTION

1. Field of the Invention

The present invention generally relates to a method of designing a connecting rod for an internal combustion engine. More specifically, the present invention relates to a design method that helps reduce the weight of a connecting rod for an internal combustion engine.

2. Background Information

An internal combustion engine has a connecting rod that interconnects a crank shaft to a piston such that rotational movement of the crank shaft is translated to reciprocal movement of the piston. Examples of connecting rods are disclosed in Japanese Laid-Open Utility Model Publication No. 5-45222 and Japanese Laid-Open Patent Publication No. 5-202923. These publications disclose methods of producing lightweight, high-strength connecting rods for internal combustion engines.

In particular, Japanese Laid-Open Utility Model Publication No. 5-45222 discloses an internal combustion engine connecting rod structure that includes a connecting rod main body, a cap and a pair of bolts serving to fasten the connecting rod main body and the cap together. The connecting rod main body has a piston pin hole formed in one end and half of a crank pin hole formed in the other end. The cap is arranged on the other end of the connecting rod main body such that the crank pin hole lies between the connecting rod main body and the cap. A bolt bearing surface is formed on the connecting rod main body. An undercut section is formed at the boundary portion between the bearing surface and a perimeter wall that intersects with the bearing surface. The undercut section is shot peened to impart a compressive residual stress in the boundary portion.

On the other hand, Japanese Laid-Open Patent Publication No. 5-202923 discloses a connecting rod comprising a connecting rod main body, a first large end half body that has internally threaded holes and is provided integrally on one end of the connecting rod main body, and a second large end half body that is fastened to the first large end half body with two bolts. The connecting rod main body and the second large end half body are made of a sintered aluminum alloy. The connecting rod is designed such that the fracture toughness of the first large end half body is larger than the fracture toughness of the second large end half body and the Young's modulus of the second large end half body is larger than the Young's modulus of the first large end half body. According to the publication, this design improves the fatigue fracture strength at the bottom of the valleys of the internal threads.

In both cases disclosed in the above mentioned publications, in order to design the bolts used for fastening the cap to the connecting rod main body, it is necessary to analyze the strength of the bolts in a standalone fashion.

In view of the above, it will be apparent to those skilled in the art from this disclosure that there exists a need for an improved method of designing a connecting rod for an internal combustion engine. This invention addresses this need in the art as well as other needs, which will become apparent to those skilled in the art from this disclosure.

SUMMARY OF THE INVENTION

It has been discovered that even if the bolts are designed to have a sufficient safety factor from a standalone perspective, then breakage and other problems still occur. Thus, when determining the bolt diameter using existing design methods, it is necessary to use speculative design to obtain a diameter with which breakage can be reliably prevented. In short, the only recourse is to select a bolt diameter that is larger than what is actually required in order to increase the strength of the bolt. Consequently, the portions of the connecting rod main body and the cap, where the bolts are installed, must be made with larger thicknesses in order to accommodate the larger bolt diameter, thus causing the weight of the connecting rod to increase.

The present invention was conceived in view of this problem. One object of the present invention is to provide a method of producing a connecting rod such that the diameters of the bolts can be designed to have the minimum required strength without depending on such speculative designs.

In accordance with one aspect of the present invention, a method of producing a connecting member, such as a connecting rod for an internal combustion engine, is provided that comprises selecting a connecting member main body having a first end with a first pin hole and a second end with a first large end part forming a first portion of a second pin hole; selecting a cap to be arranged on the second end of the connecting member main body with a second large end part forming a second portion of the second pin hole such that the second pin hole lies between the connecting member main body and the cap, and selecting a bolt serving to fasten the connecting member main body and the cap together. The bolt is selected by calculating a bolt strength safety factor based on an axial strength limit load of the bolt and a maximum load that will be born by the bolt due to an inertia force acting on the connecting member; calculating a mating surface separation safety factor based on a tensile load resulting from the inertia force and a maximum bolt load carried by the bolt at a mating surface separation limit in which the connecting member main body and the cap remain in contact without separating; and selecting the mating surface separation safety factor that is equal to or larger than the bolt strength safety factor.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
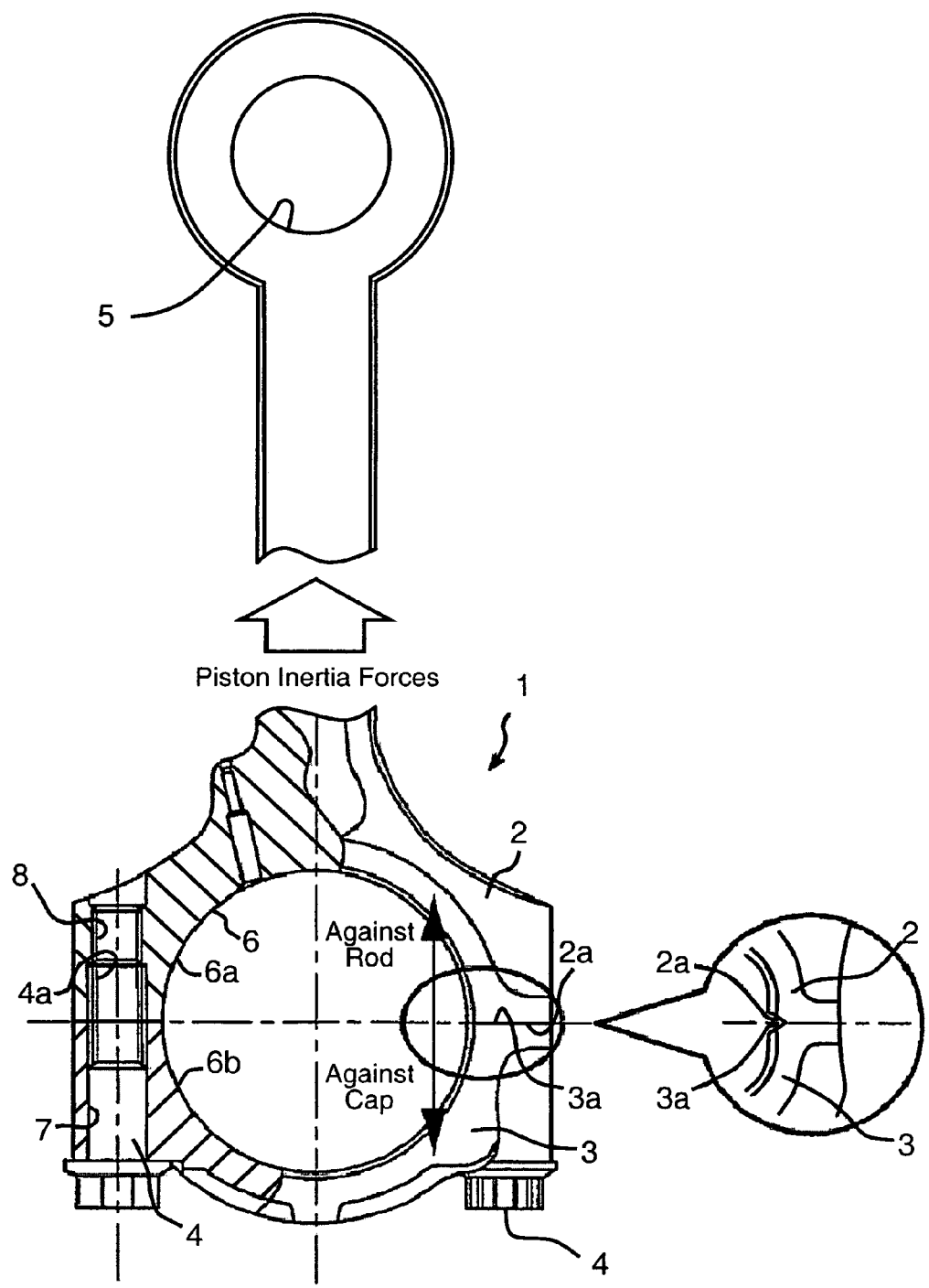
FIG. 1 is a side elevational view of a connecting rod for an internal combustion engine in accordance with the present invention and with selected portions broken away to illustrate connecting portions between a connecting rod main body and a cap.

Referring initially to FIG. 1, a connecting rod or member 1 is illustrated in accordance with a preferred embodiment of the present invention. Basically, the connecting rod 1 includes a connecting rod (member) main body 2, a cap 3 and a pair of bolts 4. The connecting rod main body 2 has a piston pin hole 5 that is formed in a first end (located toward the top of FIG. 1) and an upper crank pin hole portion or half 6a of a crank pin hole 6 that is formed in the other or second end (located at the bottom of FIG. 1). The cap 3 has a lower crank pin hole portion or half 6b of the crank pin hole 6. The cap 3 is arranged on the second end of the connecting rod main body 2 such that the crank pin hole 6 lies between the connecting rod main body 2 and the cap 3. The two bolts 4 serve to fasten the connecting rod main body 2 and the cap 3 together.

Thus, the crank pin hole 6 is formed by the upper crank pin hole portion 6a provided in the connecting rod main body 2 and the lower crank pin hole portion 6b provided in the cap 3. A crank pin of a crank shaft (not shown) passes between these pin hole portions 6a and 6b. In other words, the crank pin is sandwiched in a rotatable manner with in the crank pin hole 6 when the bolts 4 are tightened to secure the cap 3 to the connecting rod main body.

Both sides of the cap 3 are provided with a through hole 7 that is configured such that one the bolts 4 can be pass through one of the through holes 7 of the cap 3. Meanwhile, both sides of the connecting rod main body 2 are provided with an internally threaded bore 8 that is configured to mesh with the external threads 4a of the bolts 4. The connecting rod main body 2 and the cap 3 are fastened together by tightening the bolts 4 so that the external threads 4a of the bolts 4 engage the internal threads 8 of the connecting rod main body 2.

When the connecting rod 1 is used in an engine, the piston exerts an inertial force on the upper end of the connecting rod 1, i.e., at the piston pin hole 5 where the piston is attached (upper end in FIG. 1). The piston inertia force acts as an upward force on the connecting rod main body 2. Meanwhile, the crank pin exerts a downward force on the cap 3.

With conventional connecting rod design methods, it is necessary to select a large bolt diameter in order to ensure that the bolts used to fasten the connecting rod main body and the cap together are sufficiently strong and will not break. As a result, the portions of the connecting rod main body and the cap where the bolts are installed must be made with larger thicknesses, causing the connecting rod to be heavier. Meanwhile, if the connecting rod is designed by calculating the loads that act on the bolts based on the piston inertia force and determining the minimum required bolt diameter in order to reduce the weight of the connecting rod, there are cases in which the bolts still break.

Therefore, the present invention is based on the premise that the bolts 4 break due to some factor other the piston inertia force. In addition to the inertial force (upward force in FIG. 1) exerted by the piston against the connecting rod main body 2, the crank pin inside the crank pin hole 6 exerts a downward force against the cap 3. If the upward and downward forces are large, then the mating faces, i.e., the lower face 2a of the connecting rod main body 2 and the upper face 3a of the cap 3, will separate near the inside of the crank pin hole 6 (this is called "mating face separation"). When mating face separation occurs, there is the risk that the bolts 4 will break even if the diameters of the bolts 4 are large.

Figure 2:
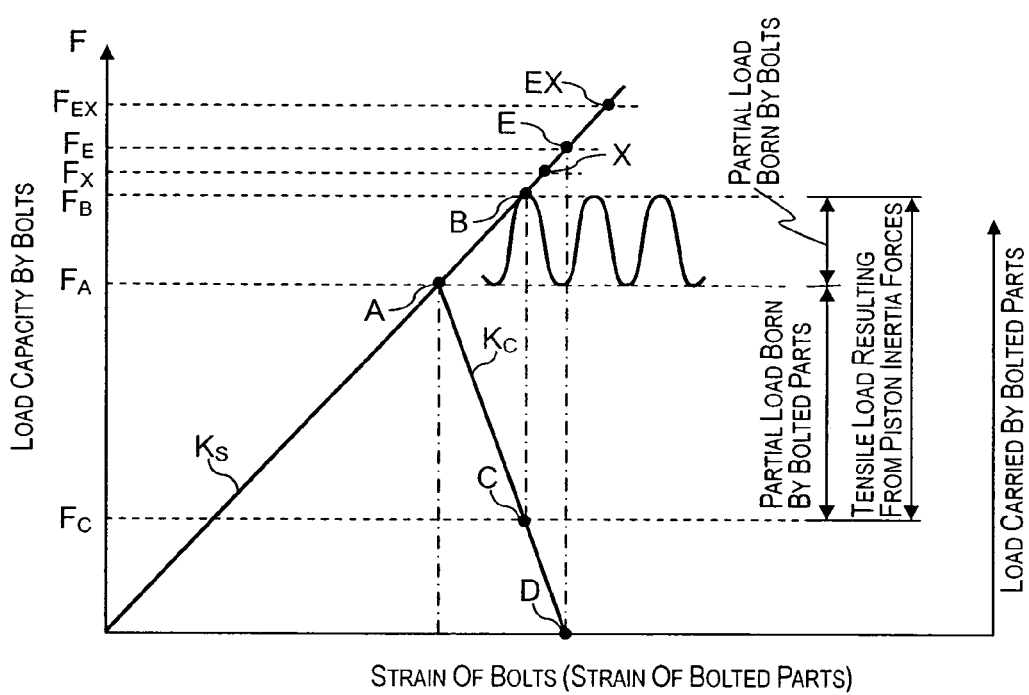
FIG. 2 is a graph that plots a load carried by a bolt versus a strain of the bolts of the connecting rod.

The forces that act on each part of the connecting rod 1 will now be described with reference to FIG. 2. FIG. 2 plots the load F carried by the bolts 4 of the connecting rod 1 versus the strain of the bolts 4. Since the connecting rod 1 uses two of the bolts 4 as shown in FIG. 1, the value indicated for the load acting on one of the bolt 4 is equal to one-half the total bolt load resulting from the piston inertia forces.

The line Ks indicates the rigidity of the bolts 4, i.e., the load F acting on the bolts 4 versus the strain of the bolts 4. The point A indicates the state of the bolts 4 when the connecting rod main body 2 and the cap 3 have been fastened together by tightening the bolts 4 and there is no piston inertia forces acting on the connecting rod 1. Thus, the force $F_A$ indicates the pure force acting on the bolts 4 due to tightening.

The line Kc indicates the load that acts on the bolted parts, i.e., the large end parts of the cap 3 and the lower portion of the connecting rod main body 2, when the bolted parts are released from the compressive force imposed by the bolts 4. When a piston inertia forces acts on the connecting rod main body 2, the load acting on the bolted parts is released from the original state achieved by tightening the bolts 4 (point A in FIG. 2). Thus, the line Kc indicates the release of the compressive force that acts on the large end parts (bolted parts) of the connecting rod main body 2 and the cap 3 as a result of tightening the bolts 4. Meanwhile, as the compressive load acting on the bolted parts is released, the load born by the bolts 4 increases from point A (see the line Ks).

The point B along the line Ks indicates the maximum load $F_B$ carried by the bolts 4 as a result of the piston inertia forces acting on the connecting rod 1. As shown in FIG. 2, the point C is the point of intersection between a straight line drawn downward from the point B and the line Kc. The point C indicates the load $F_C$. The difference between the loads at point B and C, i.e., $F_B - F_C$, is the tensile load resulting from the piston inertia force. This tensile load can be divided into a partial load born by the bolts 4 and a partial load born by the large end parts (bolted parts) of the connecting rod main body 2 and the cap 3. The load partial load born by the bolts 4 is indicated as the different between the load at point A and the load at point B, i.e., $F_B - F_A$. The partial load born by the large end parts (bolted parts) of the connecting rod main body 2 and the cap 3 is indicated as the difference between the loads at point A and point C, i.e., $F_A - F_C$.

The point D indicates the point where the line Kc goes to zero, i.e., where the large end parts of the connecting rod main body 2 and the cap 3 no longer bear a compressive load imposed by the bolts 4. In other words, the point D indicates a threshold point (mating surface separation limit point) beyond which the lower face 2a of the connecting rod main body 2 and the upper face 3a of the cap 3 will separate.

The point E indicates the load $F_E$ carried by the bolts 4 at the mating surface separation limit point. If the load F carried by the bolt 4 exceeds the mating surface separation limit point, e.g., if the load $F_{EX}$ (point EX) is carried by the bolts 4, the large end parts of the connecting rod main body 2 and the cap 3 will no longer bear any portion of the load and the entire load $F_{EX}$ will be born by the bolts 4. As a result, the bolts 4 will break.

In order to prevent the bolts 4 from breaking, it is necessary to design the bolts 4 with larger diameters to increase the axial strength limit of the bolt 4. However, if the diameters of the bolts 4 are larger than necessary, then, as described previously, the weights of the connecting rod main body 2 and the cap 3 will be larger than they could be if the bolt diameters were smaller. Additionally, even if the diameters of the bolts 4 are enlarged, the distance between the two bolts 4 will also increase and cause a larger moment to be generated due to the piston inertia forces, which can also lead to breakage of the bolts 4.

Thus, it is necessary both to reduce the weight of the connecting rod 1 and to design the bolts 4 such that they have the minimum strength required to avoid breaking. In order to accomplish this goal, it is necessary to design the connecting rod 1 such that the entire load carried by the large parts (bolted parts) of the connecting rod main body 2 and the cap 3 is not born by the bolts 4. Therefore, the bolts 4 are designed such that the axial strength limit load $F_X$ (the load corresponding to point X in FIG. 2) thereof lies between point B and point E ($F_B \leq F_X \leq F_E$), which is in the range where the load F carried by the bolts 4 does not exceed the mating surface separation limit point.

In order to accomplish this design, a strength safety factor Sfa of the bolts 4 is first calculated according to the equation shown below by dividing the axial strength limit load $F_X$ of the bolts 4 by the maximum load $F_B$ (the load at point B in FIG. 2) that will be born by the bolts 4 as a result of piston inertia forces acting on the connecting rod 1.

$$Sfa = F_X/F_B \quad (1)$$

The axial strength limit load Fx of the bolts 4 varies depending on the diameters of the bolts 4. The axial strength limit load Fx increases when the diameters are larger and decreases when the diameters are smaller.

Next, a mating surface separation safety factor Sfb is calculated according to the equation shown below by dividing the load $F_E$ carried by the bolts 4 at the mating surface separation limit by difference between the loads at points B and C, i.e., $F_B - F_C$, which is the tensile load resulting from the piston inertia force.

$$Sfb = F_E/(F_B - F_C) \quad (2)$$

The bolts 4 are then designed such that the mating surface separation safety factor Sfb is equal to or larger than the strength safety factor Sfb of the bolts 4, i.e., such that the relationship shown below is satisfied.

$$Sfb \geq Sfa \quad (3)$$

This equation (3) indicates that breakage of the bolts 4 caused by the mating surfaces, i.e., the lower face 2a of the connecting rod main body 2 and the upper surface 3a of the cap 3, starting to separate is prevented. That is, if the connecting rod main body 2, the cap 3, and the diameters of the bolts 4 are designed such that the condition expressed by this equation (3) is satisfied, the axial strength limit load $F_X$ of the bolts 4 will be set so as to lie in the range between the points B and E (i.e., $F_B \leq F_X \leq F_E$) Meanwhile, the connecting rod 1 will be designed to lie within the range between the points C and D, i.e., within the range where the large end parts (bolted parts) of the connecting rod 3 and the cap 3 remain in a compressed state (i.e., to the left of the point where the line Kc reaches zero).

While the breakage of the bolts 4 alone can be set experimentally to occur at the axial strength limit of the bolts 4, the design method of the present invention prevents breakage of the bolts 4 from occurring due to separation of the mating surfaces before the axial strength limit is reached.

If the condition expressed by the equation (3) is not satisfied because, for example, the axial strength limit of the bolts 4 is set to a load that lies beyond the point E (i.e., $F_{EX}$), the bolts 4 may break due to separation of the mating surfaces. In such a case, if the diameters of the bolts 4 have been increased, the distance between the bolts 4 will increase and the bolts 4 might break due to larger moments acting on the bolts 4. In the process of conceiving the present invention, it was determined that in conventional connecting rods in which larger bolt diameters are used, bolt breakage occurs because the mating surfaces start to separate.

Meanwhile, if the axial strength limit of the bolts 4 is set to a load that lies below point B, the large diameters of the bolts 4 will cause the connecting rod 1 to be heavier.

Thus, by designing the connecting rod 1 such that the condition expressed by the equation (3) is satisfied, the connecting rod 1 can be kept within the range where breakage of the bolts 4 due to separation of the mating surfaces is prevented and bolts 4 having only the minimum required strength can be used.

This embodiment is a method of designing an internal combustion engine connecting rod 1 that includes selecting the connecting rod main body 2 having the piston pin hole 5 formed in a first end and a first portion of the crank pin hole 6 formed in a second end as discussed above. Also the method of designing the internal combustion engine connecting rod 1 includes selecting the cap 3 to be arranged on the second end of the connecting rod main body 2 with a second portion of the crank pin hole 6 such that the crank pin hole 6 lies between the connecting rod main body 2 and the cap 3, and selecting at least one bolt serving to fasten the connecting rod main body 2 and the cap 3 together. The bolt(s) 4 is selected by calculating a bolt strength safety factor Sfa based on an axial strength limit load $F_X$ of the bolt(s) and a maximum load $F_B$ that will be born by the bolt(s) 4 due to a piston inertia force acting on the connecting rod 1 (i.e., $Sfa = F_X/F_B$), calculating a mating surface separation safety factor Sfb based on a tensile load ($F_B - F_C$) resulting from the piston inertia force and a maximum bolt load $F_E$ carried by the bolt(s) 4 at a mating surface separation limit in which the connecting rod main body 2 and the cap 3 remain in contact without separating (i.e., $Sfb = F_E/(F_B - F_C)$). Finally, the method of designing the internal combustion engine connecting rod 1 includes selecting the mating surface separation safety factor Sfb that is equal to or larger than the bolt strength safety factor Sfa of the bolts 4 (i.e., $Sfb \geq Sfa$). As a result of this design method, the bolts 4 are prevented from breaking due to separation of the mating surfaces. Furthermore, by designing the connecting rod 1 in such a manner as to satisfy the condition $Sfb \geq Sfa$, the bolts 4 can be designed to have the minimum required diameter and, consequently, the large end parts of the connecting rod main body 2 and the cap 3 can be made lighter in weight and smaller in size.

In this embodiment, the strength safety factor Sfb of the bolts 4 is calculated by dividing the axial strength limit load $F_X$ by the maximum load $F_B$ (i.e., $Sfb = F_X/F_B$). As a result, the strength safety factor Sfa of the bolts 4 can be calculated in a simpler manner.

In this embodiment, the mating surface separation safety factor Sfb is calculated by dividing the load $F_E$ carried by a bolt 4 at the mating surface separation limit by the tensile load ($F_B$–$F_C$) resulting from the piston inertia force (i.e., Sfb=$F_E$/($F_B$–$F_C$)). The mating surface separation safety factor Sfb can be calculated in a simpler manner.

In this embodiment, the tensile load resulting from the piston inertia force is calculated by subtracting the load $F_C$ that acts on the large end parts of the connecting rod main body 2 and the cap 3 as a result of the large end parts being released from the compressive force imposed by the bolts 4 from the maximum load $F_B$ that acts on a bolt 4 when the connecting rod 1 bears the piston inertia force (i.e., tensile load=$F_B$–$F_C$). As a result, the tensile load resulting from the piston inertia forces can be determined simply by experimentation or calculation.

Although this embodiment describes a case in which a connecting rod main body 2 and a cap 3 are fastened together with bolts 4, the present invention can be applied to any situation in which a moveable member is disposed between an upper member and a lower member and the upper member and lower member are fastened together with bolts. For example, the present invention can be applied to a bearing cap for a block or a cap for a cam.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus-function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A method of producing a connecting member comprising:

selecting a connecting member main body having a first end with a first pin hole and a second end with a first large end part forming a first portion of a second pin hole;

selecting a cap to be arranged on the second end of the connecting member main body with a second large end part forming a second portion of the second pin hole such that the second pin hole lies between the connecting member main body and the cap, and selecting a bolt serving to fasten the connecting member main body and the cap together, the bolt being selected by calculating a bolt strength safety factor based on an axial strength limit load of the bolt and a maximum load that will be born by the bolt due to an inertia force acting on the connecting member;

calculating a mating surface separation safety factor based on a tensile load resulting from the inertia force and a maximum bolt load carried by the bolt at a mating surface separation limit in which the connecting member main body and the cap remain in contact without separating; and selecting the mating surface separation safety factor that is equal to or larger than the bolt strength safety factor.

2. The method as recited in claim 1, wherein
the calculating of the bolt strength safety factor includes dividing the axial strength limit load by the maximum load.

3. The method as recited in claim 1, wherein
the calculating of the mating surface separation safety factor includes dividing the load carried by the bolt at the mating surface separation limit by the tensile load resulting from the inertia force.

4. The method as recited in claim 1, wherein
the calculating of the tensile load resulting from the inertia force includes subtracting the load that acts on the first and second large end parts of the connecting member main body and the cap, respectively, as a result of the first and second large end parts being released from a compressive force imposed by the bolt from the maximum load that acts on the bolt when the connecting member bears the inertia force.

5. The method as recited in claim 1, wherein
a pair of the bolts are selected to fasten the connecting member main body and the cap together.

6. The method as recited in claim 2, wherein
the calculating of the mating surface separation safety factor includes dividing the load carried by the bolt at the mating surface separation limit by the tensile load resulting from the inertia force.

7. The method as recited in claim 2, wherein
the calculating of the tensile load resulting from the inertia force includes subtracting the load that acts on the first and second large end parts of the connecting member main body and the cap, respectively, as a result of the first and second large end parts being released from a compressive force imposed by the bolt from the maximum load that acts on the bolt when the connecting member bears the inertia force.

8. The method as recited in claim 2, wherein
a pair of the bolts are selected to fasten the connecting member main body and the cap together.

9. The method as recited in claim 3, wherein
the calculating of the tensile load resulting from the inertia force includes subtracting the load that acts on the first and second large end parts of the connecting member main body and the cap, respectively, as a result of the first and second large end parts being released from a compressive force imposed by the bolt from the maximum load that acts on the bolt when the connecting member bears the inertia force.

10. The method as recited in claim 3, wherein
a pair of the bolts are selected to fasten the connecting member main body and the cap together.

11. An internal combustion engine connecting member comprising:

a connecting member main body having a first end with a first pin hole and a second end with a first large end part forming a first portion of a second pin hole;

a cap to be arranged on the second end of the connecting member main body with a second large end part forming a second portion of the second pin hole such that the second pin hole lies between the connecting member main body and the cap, and a bolt serving to fasten the connecting member main body and the cap together, the bolt being constructed with a bolt strength safety factor based on an axial strength limit load of the bolt and a maximum load that will be born by the bolt due to an inertia force acting on the connecting member;

a mating surface separation safety factor based on a tensile load resulting from the inertia force and a maximum bolt load carried by the bolt at a mating surface separation limit in which the connecting member main body and the cap remain in contact without separating; and the mating surface separation safety factor that is equal to or larger than the bolt strength safety factor.

12. The internal combustion engine connecting member as recited in claim 11, wherein the bolt strength safety factor of the bolt is based on dividing the axial strength limit load by the maximum load.

13. The internal combustion engine connecting member as recited in claim 11, wherein the mating surface separation safety factor of the bolt is based on dividing the load carried by the bolt at the mating surface separation limit by the tensile load resulting from the inertia force.

14. The internal combustion engine connecting member as recited claim 11, wherein the tensile load resulting from the inertia force of the bolt is based on subtracting the load that acts on the first and second large end parts of the connecting member main body and the cap, respectively, as a result of the first and second large end parts being released from a compressive force imposed by the bolt from the maximum load that acts on the bolt when the connecting member bears the inertia force.

15. The internal combustion engine connecting member as recited in claim 11, wherein a pair of the bolts interconnect the connecting member main body and the cap together.

16. The internal combustion engine connecting member as recited in claim 12, wherein the mating surface separation safety factor of the bolt is based on dividing the load carried by the bolt at the mating surface separation limit by the tensile load resulting from the inertia force.

17. The internal combustion engine connecting member as recited claim 16, wherein the tensile load resulting from the inertia force of the bolt is based on subtracting the load that acts on the first and second large end parts of the connecting member main body and the cap, respectively, as a result of the first and second large end parts being released from a compressive force imposed by the bolt from the maximum load that acts on the bolt when the connecting member bears the inertia force.

18. The internal combustion engine connecting member as recited in claim 17, wherein a pair of the bolts interconnect the connecting member main body and the cap together.

19. An internal combustion engine connecting member comprising:

main body connecting means for a first pin hole at a first end and for forming a first portion of a second pin hole at a second end;

cap means for forming a second portion of the second pin hole to be arranged on the second end of the main body connecting means, and bolt means for fastening the main body connecting means and the cap means, the bolt means being constructed with a bolt strength safety factor based on an axial strength limit load of the bolt means and a maximum load that will be born by the bolt means due to an inertia force acting on the connecting member;

a mating surface separation safety factor based on a tensile load resulting from the inertia force and a maximum bolt load carried by the bolt means at a mating surface separation limit in which the main body connecting means and the cap means remain in contact without separating; and the mating surface separation safety factor that is equal to or larger than the bolt strength safety factor.

* * * * *